(12) United States Patent
Gardenswartz

(10) Patent No.: US 8,533,035 B2
(45) Date of Patent: Sep. 10, 2013

(54) TEAM SHOPPING

(75) Inventor: Will Harris Gardenswartz, Laguna Beach, CA (US)

(73) Assignee: Life Carrot, Inc., Laguna Beach, CA (US)

( * ) Notice: Subject to any disclaimer, the term of this patent is extended or adjusted under 35 U.S.C. 154(b) by 59 days.

(21) Appl. No.: 13/078,705

(22) Filed: Apr. 1, 2011

(65) Prior Publication Data

US 2011/0246265 A1    Oct. 6, 2011

Related U.S. Application Data

(60) Provisional application No. 61/341,838, filed on Apr. 5, 2010.

(51) Int. Cl.
*G06Q 30/00* (2012.01)

(52) U.S. Cl.
USPC .................. 705/14.27; 705/14.1; 705/14.34

(58) Field of Classification Search
USPC .......................................... 705/14.1
See application file for complete search history.

(56) References Cited

U.S. PATENT DOCUMENTS 6,269,343 B1 * 7/2001 Pallakoff ..................... 705/26.2
2003/0229540 A1 * 12/2003 Algiene ....................... 705/14

OTHER PUBLICATIONS

Kauffman et al., "New Buyers' Arrival Under Dynamic Pricing Market Microstructure: The Case of Group-Buying Discounts on the Internet", Proceedings of the 34th Hawaii International Conference on System Sciences, 2001.*
Nelson, "Ditch the Clipping, Try Electronic Coupons", Good Morning America, American Broadcasting Company, Sep. 11, 2007, found online at abcnews.go.com/CMA/Consumer/story/?id=3586035&page=1.*
"Airline miles", The Economist, May 2, 2002.*
Rockefeller, Random Reminiscenses of Men and Events, 1909, quoted in "On the Standard Oil Company", National Center for the Humanities, found on line at nationalhumanitiescenter.org/pds/gilded/power/text2/standardoil.pdf.*

* cited by examiner

*Primary Examiner* — John G Weiss
*Assistant Examiner* — Scott C Anderson
(74) *Attorney, Agent, or Firm* — Pillsbury Winthrop Shaw Pittman LLP

(57) ABSTRACT

A method of improving sales volume includes the steps of distributing redeemable offers to teams of shoppers wherein the shoppers are able to receive whatever basic discounts or other benefits that may be available to all shoppers, but also to receive a "kicker" benefit when the team achieves a specified purchasing objective such as a total of all sales to members of the team. Teams may compete for prizes or other benefits beyond those offered to individual teams.

27 Claims, 3 Drawing Sheets

TEAM SHOPPING

CROSS-REFERENCE TO RELATED APPLICATIONS

This application is a non-provisional application describing the same invention as an active provisional application, Ser. No. 61/341,838, filed on Apr. 5, 2010, and being filed within one year, hereby claims date priority therefrom, and further, said provisional application is hereby incorporated herein by reference.

BACKGROUND

This disclosure relates generally to information systems and in particular to an information system and method enabling consumer rebates and improved sales volume for retailers and manufacturers. In the present method, a group of consumers acting as a team are each offered a special program coupon for a discount on a particular product. A face value of the program coupon is discounted from the product's price when purchased by each one of the consumers in the team. An additional amount; a rebate, is awarded to each of the team consumers when they, as a team, have purchased a minimum number of the product. The amount due to each team member after the promotion period can be distributed in several ways including but not limited to: by mail, as a direct deposit to a team member's bank account, as a credit to a credit or debit card account, as a credit to a mobile/smart phone bill, or as a cash voucher generated in a store such as those generated by COINSTAR® and CATALINA MARKETING®. Social media are helping a variety of "group buying" scenarios flourish. In these services, such as offered by Groupon.com, wherein a group of people commit to an offer such as a $100 massage for $50. The participants commit to the Groupon.com offer by actually buying/pre-paying for the massage and hoping that a threshold that makes the offer valid is achieved. If the threshold is achieved each person in the group gets a certificate that entitles him or her to the offer. If not, they receive a full refund of their original payment. There are many such services, but none directed to the needs of supermarkets and/or consumer packaged goods manufacturers or to the method described herein. Few consumers would probably pre-pay for a discount on groceries (in large part because the grocery items desired by individual consumers vary widely), but consumers readily participate in coupon and rebate schemes that reduce the price of an item at the time of purchase or at a time after purchase when the purchase is confirmed. Moreover, the pre-payment method advocated by GROUPON® and similar services do not readily mesh with the flow of promotional dollars in multi-product retailers such as supermarkets where almost all discounts given to consumers are ultimately borne by manufacturers.

The system shown in the drawing figures and described in the detailed description of this application is a solution to several of the characteristic problems of the grocery and similar multi-product retail industries, e.g., THE HOME DEPOT®, BEST BUY®, CVS®, etc., and the manufacturers that supply them, and results in the benefits described herein.

SUMMARY

The present method joins the ideas of conventional coupon usage and electronic social media. It enables consumers to team up through social media for the enjoyment of greater discounts on purchased goods, and it provides a means by which manufacturers and retailers can reward consumers for their higher sales volume.

One version of the present method includes: forming a team of consumers, publicizing a coupon offer for $1.00 discount on a specific product, purchasing the product at its regular price less the amount of the coupon discount, providing a further discount, a "kicker" to each of the members of the team if the team purchases a required number of units of the product. When that occurs, the amount of the kicker is banked/stored for—and later distributed to—each of the members.

In other versions of the present method coupons may not be used as a factor or element. Store-specials, such as may appear in a printed or electronic circular or that may be denoted with shelf-tags and/or triggered by a loyalty card, checkout basket totals, recipes items, diet plans and many other approaches may enjoy the benefit of team shopping and may use the team kicker concept.

The team shopping, team kicker method is managed by a program manager (PM). Consumers may form a team, or may join an existing team by registering at a PM Web site, an affiliate Web site, a PM application, or an affiliated application where the offer is presented. Team members are engaged and provided with a team "dashboard" which provides a guide with status information so that team members may see what their current rebate amount is and how it is affected by the status/performance of the various team members. This dashboard helps to fuel the desired effect of the invention, namely that team members who perform have a stake in encouraging team members who don't perform as the "kicker" is only awarded if all or most of the team performs and/or a certain quantity of items are sold before the offer expires.

Teams are tracked via shopper loyalty cards or other unique identifiers such as credit/debit card number or even a smart/mobile phone number which are presented at a checkout stand. Kickers are banked/stored and may be paid out in many different ways such as credits on a consumer's credit card or direct deposit to a consumer's bank account. Teams may be formed on Facebook.com or another social network website, a branded destination website, or on a supermarket website. Teams may also compete for points, sweepstakes entries, and prizes.

The details of one or more embodiments of these concepts are set forth in the accompanying drawings and the description below. Other features, objects, and advantages of these concepts will be apparent from the description and drawings, and from the claims.

DESCRIPTION OF DRAWINGS

Like reference symbols in the various drawings indicate like elements.

DETAILED DESCRIPTION

The above described drawing figures illustrate the present disclosure in at least one of its preferred embodiments, which is further defined in detail in the following description. Those having an ordinary skill in this art may be able to make alterations and modifications to what is described herein without departing from its spirit and scope. Therefore, it should be understood that what is illustrated is set forth only for the purposes of example and that it should not be taken as a limitation on the scope of the present apparatus and method of use.

This description defines a system 10 and method for improving the sales level of retailers (and especially those that carry a multitude of products or so called SKUs (stock-keeping units). As such it is a promotional enablement providing a benefit to consumers as well as to retailers and manufactures; these three factors being the primary operatives in the present method.

Figure 1:
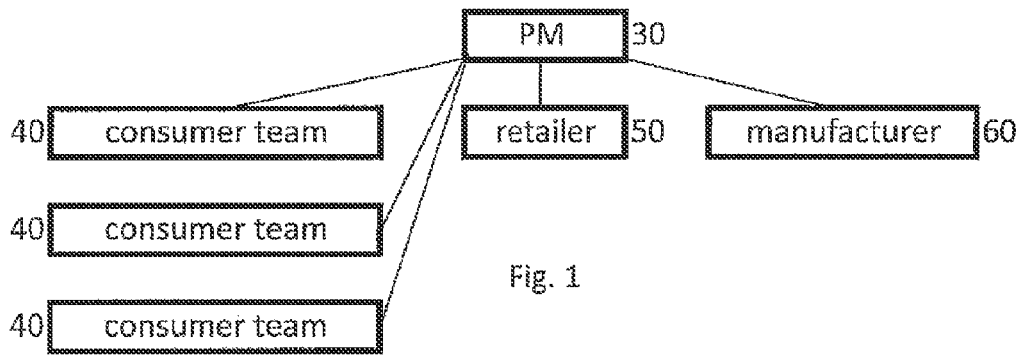
FIGS. 1-4 are diagrams showing examples of systems in accordance with the present disclosure.

The method is based on a system 10 made up of computer servers tied together by a telecommunication system such as the Internet. The system 10 is an information exchange network consisting, in one version, shown in FIG. 1, of one or more of each of: Program Manager (PM) servers 30, teams of consumer servers 40, retailer servers 50, and manufacturer servers 60. The term "server" as used here shall be understood to mean any digital information processing device such as a computer, a cellular telephone, or any similar device capable of receiving, processing and displaying information. In this disclosure the singular shall also take the meaning of plurality without distinction. In this disclosure the names of the owner/operators of the servers identified by numerals 30-60 may be used in place of the term "server" and in each instance shall have the identical meaning.

Figure 2:
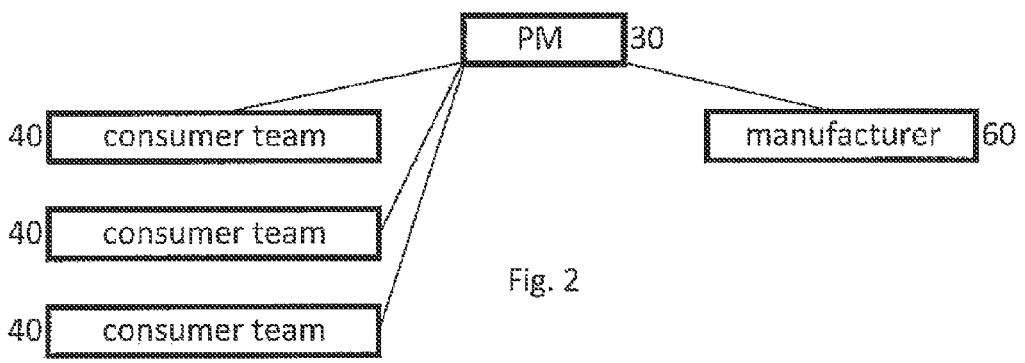

FIG. 2 illustrates another version of the present system 10. Here, the system consists of the PM 30, the teams of consumers 40, and the manufacturer 60.

Figure 3:
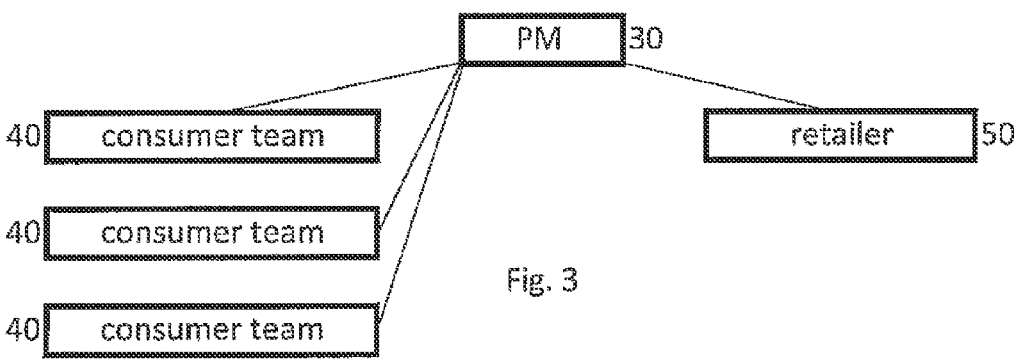

FIG. 3 illustrates still another version of the present system 10. Here, the system consists of the PM 30, the teams of consumers 40, and the retailer 50.

Figure 4:
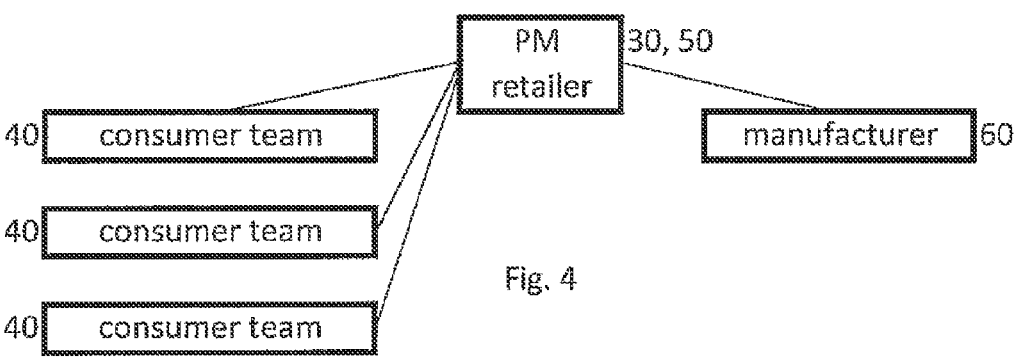

FIG. 4 illustrates yet another version of the present system 10. Here, the system consists of a combination PM 30 and retailer 50, the teams of consumers 40 and a manufacturer 60.

Figure 5:
FIG. 5 is an example of a coupon that may be used in accordance with a method of the present disclosure.

FIG. 5 illustrates a coupon 70 that is used with the method of this disclosure. The coupon has the elements of a typical example including a product 80, CHEERIOS®, a benefit 90, $1.00 off, and it also has a further benefit of a payout of 25 cents value, the kicker 100 (per team member) if the entire team purchases the product, or for those team members that do purchase the product. The coupon 70 may also have an expiration date as is well known (not shown).

Figure 6:
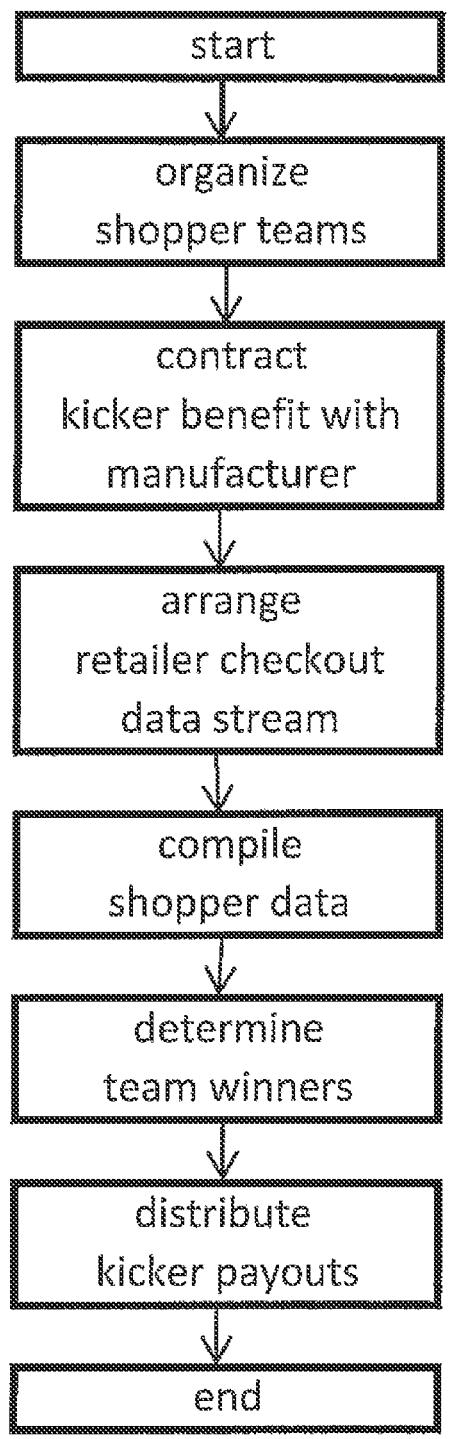
FIG. 6 is a diagram illustrating an example of the presently described method.

FIG. 6 illustrates an example of the present method including the steps of organizing the shopper teams, contracting kicker benefits with a manufacturer 60, or alternately with a retailer 50, arranging for a retailer checkout data stream to be sent to the program manager 30, followed by compiling the data to determine if a given team's sales volume is high enough to trigger the kicker payout, and if so, triggering the payout with either the retailer 50 or the manufacturer 60, and then distributing the kicker payouts to the team/team members.

In the various versions, the PM 30 organizes the system 10 and manages its operation. Through advertising, notification, or in any other manner, the PM 30 encourages consumers 40 to organize themselves into teams and to register their teams with the PM 30. The PM 30 then negotiates a contract with either the retailer 50 and, or the manufacturer 60 to offer a kicker redemption benefit over-and-above any benefits that may already be offered by the retailer 50 and, or the manufacturer 60 for consumer purchases. With such a contract in place, the PM 30 presents the deal to the consumer teams (teams) 40. The teams 40 are notified that if the team 40 purchases at least a specified volume, or a specified total dollar value of a product, a series of products, products of a specified manufacturer or brand, or any similar specification; before a specified expiration date, each member of the complying/performing team 40 will receive a specified kicker benefit. The operating rules may be designed by the PM as desired. For instance, the rules may allow for some members of a team to receive the kicker benefit while others who have not met a specified member related goal, are not. Additionally, the teams 40 may be set into competition with each other by including in the deal, a "super-kicker" benefit based on which team 40 purchases the highest dollar volume per se, or per member, or achieves the team goal before other teams, or any similar arrangement.

The arrangement with the retailer 50 enables the PM 30 to receive team purchasing information when the consumers use their retailer loyalty cards or other registered unique identifier which is scanned/logged by the retailer at the point of purchase. Recognition of a purchase may alternately be recorded when a consumer uses a telecommunication device such as a computer or a smart phone and enters a recognizable personal identification number (PIN). The purchase details are then telecommunicated to the PM 30 and recorded and aggregated. According to the agreement between the PM 30 and the retailer 50 or manufacturer 60, or both, when team purchasing exceeds stipulated requirements to trigger the kicker, the specified benefit is awarded to the team members individually, or to the team 40 as a whole. Actual payout may be by check, airline points, and direct deposit to a team member's bank account or by any other means agreed to by the consumers. Alternatively, the team members may agree that they will work for a mutual prize—or entries into a drawing for a mutual prize—such as an all expenses paid trip to a desired resort that can be enjoyed by all of the team members at the same time together.

In one embodiment, the method may use a traditional coupon for presenting the offer to a consumer. The coupon has printed on it, a product identity, the item to be purchased, a primary redemption amount, typical of a coupon and most often simply a reduction in the price of the product, a personal redemption behavior required for receiving the primary redemption amount, typically simply making the purchases at the reduced price, a kicker redemption amount which may be a direct payout compensation for making the purchase, to and a team redemption behavior required for receiving the kicker redemption amount, the latter being a total quantity or dollar value that must be accumulated by a given date to trigger the kicker benefit.

In another example, consumers download coupons to mobile phones or to a specific loyalty card number. Such electronic "coupons" can have kickers that function as described above so that when the consumer presents a unique identifier such as a loyalty card number, cell phone number, or even a secure number embedded in the cell phone, the kicker benefit is registered and accounted for.

In yet another example, the same process may proceed with the consumer purchasing a product from an e-tailer such as AMAZON.COM® or BUY.COM® wherein a product is displayed on an e-tailer Web site along with a price and a notice of a kicker amount if the purchaser has a coupon. Alternately, no coupon is required, but the kicker amount is offered simply for purchasing the product on-line.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method of improving sales volume of at least one retailer through distribution of coupons having multiple incentives to teams of consumers, the method being implemented by at least one physical processing device, the method comprising:

obtaining, by a program manager server, data identifying at least one team of consumers;

providing a coupon to each member of the at least one team of consumers, the coupon including (i) a first incentive comprising a discount that is applied upon purchase of an associated product from the at least one retailer, and (ii) a second incentive comprising a rebate that is awarded when a purchasing objective is attained by the at least one team of consumers;

receiving at the program manager server, from a retail server associated with the at least one retailer over a network redemption data corresponding to redemption of the coupon by one or more members of the at least one team of consumers, wherein each member of the at least one team of consumers is identified by a unique identifier;

determining, at the program manager server, whether the purchasing objective has been attained by the at least one team of consumers based on the received redemption data; and distributing the rebate to the at least one team of consumers responsive to a determination that the at least one team of consumers has attained the purchasing objective.

2. The method of claim 1, wherein obtaining data identifying at least one team of consumers further comprises:
obtaining data identifying the at least one team of consumers via a program manager website hosted by the program manager server.

3. The method of claim 1, wherein obtaining data identifying at least one team of consumers further comprises:
obtaining data identifying the at least one team of consumers from a social networking application.

4. The method of claim 1, further comprising:
providing a team interface for the at least one team of consumers that is accessible by each member of the at least one team of consumers, the team interface including status information regarding progress of the at least one team of consumers toward attaining the purchasing objective.

5. The method of claim 4, wherein the status information identifies members of the at least one team of consumers that have redeemed the coupon.

6. The method of claim 1, wherein the purchasing objective comprises purchase of a specified volume of the associated product by a specified date.

7. The method of claim 1, wherein the purchasing objective comprises purchase of a specified total dollar value of the associated product by a specified date.

8. The method of claim 1, wherein the unique identifier comprises at least one of a credit or debit card number.

9. The method of claim 1, wherein the unique identifier comprises a telephone number.

10. The method of claim 1, wherein the unique identifier comprises a loyalty card number.

11. The method of claim 1, wherein the coupon comprises an electronic coupon.

12. The method of claim 1, wherein providing a coupon to each member of the at least one team of consumers further comprises:
associating the coupon with a loyalty card number of each member.

13. The method of claim 1, wherein distributing the rebate to the at least one team of consumers further comprises:
distributing the rebate to each member of the at least one team of consumers.

14. The method of claim 1, wherein the rebate is distributed to a member of the at least one team of consumers by mail.

15. The method of claim 1, wherein the rebate is distributed to a member of the at least one team of consumers by direct deposit to a bank account of the member.

16. The method of claim 1, wherein the rebate is distributed to a member of the at least one team of consumers by crediting a credit or debit card account of the member.

17. The method of claim 1, wherein the rebate is distributed to a member of the at least one team of consumers by crediting a telephone bill of the member.

18. The method of claim 1, wherein the rebate is distributed to a member of the at least one team of consumers by providing a cash voucher to the member.

19. The method of claim 1, wherein distributing the rebate to the at least one team of consumers further comprises:
distributing the rebate to a predetermined number of members of the at least one team of consumers.

20. The method of claim 1, wherein the program manager server is operated by the at least one retailer.

21. The method of claim 1, wherein the program manager server is operated by a manufacturer of the product.

22. The method of claim 1, further comprising:
providing a third incentive to the at least one team of consumers when a team competition criteria is achieved.

23. The method of claim 22, wherein the team competition criteria comprises satisfying the purchasing objective before one or more other competing teams of consumers.

24. The method of claim 22, wherein the third incentive comprises a donation to a charity on behalf of the at least one team of consumers.

25. A system for improving sales volume of at least one retailer through distribution of coupons having multiple incentives to teams of consumers, the system comprising:

at least one physical processing device configured to:
obtain data identifying at least one team of consumers;
provide a coupon to each member of the at least one team of consumers, the coupon including (i) a first incentive comprising a discount that is applied upon purchase of an associated product from the at least one retailer, and (ii) a second incentive comprising a rebate that is awarded when a purchasing objective is attained by the at least one team of consumers;
receive, from a retail server associated with the at least one retailer, over a network, redemption data corresponding to redemption of the coupon by one or more members of the at least one team of consumers, wherein each member of the at least one team of consumers is identified by a unique identifier;
determine whether the purchasing objective has been attained by the at least one team of consumers based on the received redemption data; and
distribute the rebate to the at least one team of consumers responsive to a determination that the at least one team of consumers has attained the purchasing objective.

26. A computer-implemented method of improving sales volume of at least one retailer through distribution of offers having multiple incentives to a group of consumers, the method being implemented by at least one physical processing device, the method comprising:

providing an offer to each consumer of a group of consumers, the offer including (i) a first incentive comprising a discount that is applied upon purchase of at least one associated product from the at least one retailer, and (ii) a second incentive comprising a benefit that is awarded when a purchasing objective is attained by the group of consumers;

receiving, at a program manager server, from a retail server associated with the at least one retailer, over a network, redemption data corresponding to redemption of the offer by one or more consumers of the group of consumers, wherein each consumer of the group of consumers is identified by a unique identifier;

determining, at the program manager server, whether the purchasing objective has been attained by the group of consumers based on the received redemption data; and distributing the benefit to the group of consumers responsive to a determination that the group of consumers has attained the purchasing objective.

27. A system for improving sales volume of at least one retailer through distribution of offers having multiple incentives to a group of consumers, the system comprising:

at least one physical processing device configured to:

provide an offer to each consumer of a group of consumers, the offer including (i) a first incentive comprising a discount that is applied upon purchase of at least one associated product from the at least one retailer, and (ii) a second incentive comprising a benefit that is awarded when a purchasing objective is attained by the group of consumers;

receive, from a retail server associated with the at least one retailer, over a network, redemption data corresponding to redemption of the offer by one or more consumers of the group of consumers, wherein each consumer of the group of consumers is identified by a unique identifier;

determine whether the purchasing objective has been attained by the group of consumers based on the received redemption data; and distribute the benefit to the group of consumers responsive to a determination that the group of consumers has attained the purchasing objective.

* * * * *